United States Patent
Tranninger et al.

(10) Patent No.: US 9,988,523 B2
(45) Date of Patent: Jun. 5, 2018

(54) POLYPROPYLENE COMPOSITION COMBINING LOW SEALING INITIATION TEMPERATURE, LOW HAZE, LOW HEXANE SOLUBLES AND IMPROVED TEAR RESISTANCE AND MELTING TEMPERATURE

(71) Applicant: BOREALIS AG, Vienna (AT)

(72) Inventors: Cornelia Tranninger, Pucking (AT); Kauno Alastalo, Porvoo (FI); Johanna Lilja, Porvoo (FI); Kristin Reichelt, Neuhofen/Krems (AT); Petar Doshev, Linz (AT)

(73) Assignee: BOREALIS AG, Vienna (AT)

( * ) Notice: Subject to any disclaimer, the term of this patent is extended or adjusted under 35 U.S.C. 154(b) by 0 days. days.

(21) Appl. No.: 15/551,464

(22) PCT Filed: Feb. 29, 2016

(86) PCT No.: PCT/EP2016/054191
§ 371 (c)(1),
(2) Date: Aug. 16, 2017

(87) PCT Pub. No.: WO2016/139163
PCT Pub. Date: Sep. 6, 2016

(65) Prior Publication Data
US 2018/0030256 A1 Feb. 1, 2018

(30) Foreign Application Priority Data

Mar. 2, 2015 (EP) .................... 15157087

(51) Int. Cl.
| | | |
|---|---|---|
| *C08L 23/14* | (2006.01) | |
| *C08J 5/18* | (2006.01) | |
| *B29C 47/00* | (2006.01) | |
| *B29K 23/00* | (2006.01) | |
| *C08F 2/00* | (2006.01) | |

(52) U.S. Cl.
CPC .......... *C08L 23/14* (2013.01); *B29C 47/0004* (2013.01); *B29C 47/0026* (2013.01); *B29C 47/0057* (2013.01); *C08J 5/18* (2013.01); *C08L 23/142* (2013.01); *B29K 2023/12* (2013.01); *C08F 2/001* (2013.01); *C08J 2323/14* (2013.01); *C08J 2423/14* (2013.01); *C08L 2203/162* (2013.01); *C08L 2205/025* (2013.01)

(58) Field of Classification Search
CPC .... C08L 23/14; C08L 23/142; C08L 2203/16; C08L 2203/162; C08L 2205/025; C08J 5/18; C08J 2323/14; C08J 2423/14; B29C 55/28; C08F 210/06; C08F 210/14; C08F 210/16; C08F 2/001; C08F 297/083
See application file for complete search history.

(56) References Cited

U.S. PATENT DOCUMENTS

2014/0121325 A1  5/2014  Holtcamp et al.

FOREIGN PATENT DOCUMENTS

| EP | 0887379 A1 | 12/1998 |
|---|---|---|
| EP | 2386603 A1 | 11/2011 |
| EP | 2653496 A1 | 10/2013 |
| WO | 92/12182 A1 | 7/1992 |
| WO | 2010052260 A1 | 5/2010 |
| WO | 2010052263 A1 | 5/2010 |
| WO | 2010052264 A1 | 5/2010 |
| WO | 2013007650 A1 | 1/2013 |
| WO | 2013127758 A1 | 9/2013 |
| WO | 2013127760 A1 | 9/2013 |
| WO | WO 2013/127758 A1 * | 9/2013 |

OTHER PUBLICATIONS

Extended European Search Report issued by the European Patent Office, Munich, for Application No. EP15157087, dated Sep. 14, 2015, 4 pages.
PCT, Notification of Transmittal of the International Search Report and the Written Opinion for PCT/EP2016/054191, dated Apr. 29, 2016, 9 pages.
Edward P. Moore, Jr., Editor, "Polypropylene Handbook, Polymerization, Characterization, Properties, Processing, Applications", Hanser Publishers, 1996, 4 pages.
FDA method (federal registration, title 21, Chapter 1, part 177, section 1520, s. Annex B), 2016.
Soares, J.B.P., Fractionation, in: Encyclopedia of Polymer Science and Technology, John Wiley & Sons, New York, pp. 75-131, vol. 10, 2001.
Office Action for Chinese Patent Application No. 201680010785.8 with Enlglish Translation dated Feb. 2, 2018, 3 pages.

* cited by examiner

*Primary Examiner* — Roberto Rabago
(74) *Attorney, Agent, or Firm* — Lowenstein Sandler LLP

(57) ABSTRACT

Polypropylene composition which combines low sealing initiation temperature (SIT) and high melting point ($T_m$), furthermore showing a broad sealing window, low hexane solubles and good optical properties, like low haze.

14 Claims, No Drawings

POLYPROPYLENE COMPOSITION COMBINING LOW SEALING INITIATION TEMPERATURE, LOW HAZE, LOW HEXANE SOLUBLES AND IMPROVED TEAR RESISTANCE AND MELTING TEMPERATURE

CROSS REFERENCE TO RELATED APPLICATION(S)

This application is a national phase of International Application No. PCT/EP2016/054191, filed on Feb. 29, 2016, which claims the benefit of European Patent Application No. 15157087.6, filed on Mar. 2, 2015. The contents of these applications are hereby incorporated by reference in their entirety.

The present invention is related to a new polypropylene composition which combines low sealing initiation temperature (SIT) and high melting point ($T_m$). In addition the inventive composition shows a broad sealing window, low hexane solubles and good optical properties, like low haze.

The present invention is furthermore related to the manufacture of such composition and to its use.

Polypropylenes are suitable for many applications.

For instance polypropylene (PP) is applicable in areas where sealing properties play an important role, like in the food or medical packing industry.

Heat sealing is the predominant method of manufacturing flexible and semi-rigid packages.

Important characteristics of good sealing performance are inter alia a) low seal initiation temperature, which is needed to support high speed on packaging machines, b) broad sealing window, which is especially needed for processing window on HFFS (Horizontal Form, Fill and Seal) packaging lines and c) additionally high melting point, which is important, in particular for biaxially oriented PP, to avoid stickiness and blocking and accomplish high BOPP line speeds.

To ensure fast sealing, a low SIT is of advantage. By operating at lower temperature there is the benefit that the article to be sealed is not exposed to high temperatures. There are also economic advantages since lower temperatures are of course cheaper to generate and maintain.

There are further advantages by avoiding high sealing temperatures, especially when temperature sensitive goods are to be packed.

Furthermore, it is also desired to have a packaging material with satisfying optical properties, such as low haze or high clarity.

In the field of some food applications such as retort pouches or some medical applications, a sterilization treatment is needed.

The most common sterilization procedures are the use of heat (steam), radiation (beta radiation, electrons, or gamma radiation) or chemicals (usually ethylene oxide). Steam sterilisation is usually carried out in a temperature range of about 120 to 130° C. Thus, the material should have a sufficient thermal stability, like a melting temperature significantly higher than the usual steam sterilization temperature of about 120 to 130° C.

Of course, treatment of a polymer under the sterilization conditions outlined above can impair its final properties, especially the optical properties such as transparency.

Irrespectively from the polymer type, a polymer must fulfil at best all desired end properties and additionally must be easily processable, i.e. must withstand stress. However, end properties and processing properties act often in a conflicting manner.

It frequently turns out that improvement of one of the desired properties is achieved on the expense of the other properties.

Therefore there is still a need to design materials having an improved balance between high melting point and low sealing initiation temperature SIT, which additionally possess a broad sealing window, beneficial optical properties, low amounts of hexane solubles and sufficient thermal stability to enable sterilization treatment without negatively affecting the optical properties.

The present invention is based on the finding that the above discussed needs for heat sealing applications, i.e. simultaneously having improved balance between high melting point and low sealing initiation temperature SIT, broad sealing window, beneficial optical properties, low amounts of hexane solubles and sufficient thermal stability to enable sterilization treatment without negatively affecting the optical properties can be achieved by a specific design of a polyolefin composition.

Thus, according to a first aspect of the present invention is directed to a polypropylene composition being a binary blend comprising 2 polypropylene polymer fractions P1 and P2:

35 to 60 wt % of (P1) being a propylene copolymer comprising hexene-derived comonomer units in an amount of 0.5 to 2.5 wt % and 65 to 40 wt % of (P2) being a propylene terpolymer comprising hexene-derived comonomer units in an amount of 4.0 to 10.0 wt % and ethylene-derived comonomer units in an amount of 0.1 to 1.0 wt %, and whereby the composition is characterized by
(i) a ratio of the hexene content of polymer fraction P2 to polymer faction P1 between 2.5 and 8.0
(ii) a ratio of the total hexene amount of the composition to the hexene amount of polymer fraction P1 between 1.5 and 4.0
(ii) a melt flow rate MFR2 (230° C.) measured according to ISO 1133 in the range of 2.0 to 15.0 g/10 min,
(iii) a melting temperature Tm as determined by DSC according to ISO 11357 of from 128° C. to 145° C.,
(iv) a crystallization temperature $T_c$ as determined as determined by DSC according to ISO 11357 of from 82° C. to 110° C. and
(v) a hexane solubles content determined in accordance with FDA section 177.1520 of at most 1.0 wt %
(vi) and an amount of xylene cold soluble (XCS) in the range of 10 to 40 wt % determined at 25° C. according ISO 16152; first edition; 2005-07-01.

In a second aspect the present invention is related to a polypropylene composition comprising the 2 polymer fractions (P1) and (P2), whereby the composition is obtainable, preferably obtained, in the presence of a metallocene catalyst.

In a third aspect the present invention is related to a process for producing a polypropylene composition comprising the 2 polymer fractions (P1) and (P2) by sequential polymerization process comprising at least two reactors connected in series, wherein the process comprises the steps of
a) polymerizing in a first reactor (R-1) being a slurry reactor (SR), preferably a loop reactor (LR), propylene and hexene, obtaining a $C_3C_6$ random copolymer fraction (P1) as defined above, b) transferring said $C_3C_6$ random copolymer fraction (P1) and unreacted comonomers of the first reactor in a second reactor (R-2) being a first gas phase reactor (GPR-1),
c) feeding to said second reactor (R-2) propylene, hexene and ethylene,
d) polymerizing in said second reactor (R-2) and in the presence of said first $C_3C_6$ random copolymer fraction (P1) propylene, hexene and ethylene obtaining a $C_3C_6C_2$ terpolymer fraction (P2),
said $C_3C_6$ random copolymer (P1) and $C_3C_6C_2$ terpolymer fraction (P2) form the polypropylene composition as defined above,
whereby the polymerization takes place in the presence of single site solid particulate catalyst, preferably free from an external carrier, more preferably a catalyst comprising (i) a complex of formula (I):

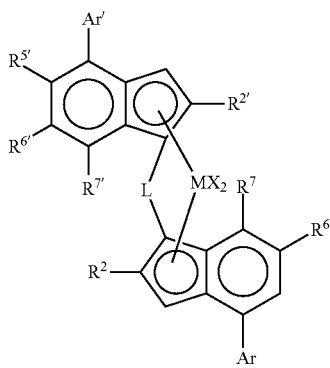

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, C$HV$-hydrocarbyl, tri(C$_1$-C$_{20}$-alkyl)silyl, C$_6$-C$_{20}$-aryl, C$_7$-C$_{20}$-arylalkyl or C$_7$-C$_{20}$-alkylaryl;
$R^2$ and $R^{2'}$ are each independently a C$_1$-C$_{20}$ hydrocarbyl radical optionally containing one or more heteroatoms from groups 14-16;
$R^{5'}$ is a C$_{1-20}$ hydrocarbyl group containing one or more heteroatoms from groups 14-16 optionally substituted by one or more halo atoms;
$R^6$ and $R^{6'}$ are each independently hydrogen or a C$_{1-20}$ hydrocarbyl group optionally containing one or more heteroatoms from groups 14-16;
$R^7$ and $R^{7'}$ are each independently hydrogen or C$_{1-20}$ hydrocarbyl group optionally containing one or more heteroatoms from groups 14-16;
Ar is independently an aryl or heteroaryl group having up to 20 carbon atoms optionally substituted by one or more groups $R^1$;
Ar' is independently an aryl or heteroaryl group having up to 20 carbon atoms optionally substituted by one or more groups $R^1$;
each $R^1$ is a C$_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$;
each $R^4$ is a C$_{1-20}$ hydrocarbyl group;
and (ii) a cocatalyst comprising a compound of a group 13 metal, e.g. Al or boron compound.

In a fourth aspect the invention is related to the use of the above defined polypropylene composition for preparing articles.

In a fifth aspect the invention is related to films comprising the above defined polypropylene composition, whereby the films are characterized by
(i) a seal initiation temperature (SIT) (determined as described in the experimental part) of below 110° C.
(ii) satisfying the equation $T_m$–SIT≥25
(iii) a haze (determined according to ASTM D1003-00 on cast films with a thickness of 50 μm) of at most 1.5%
(iv) a transparency (determined according to ASTM D1003-00 on cast films with a thickness of 50 μm) of at least 90.0%
(v) a relative tear resistance in machine direction [N/mm] according to Elmendorf method (ISO 6383-2) for a cast film thickness of 50 μm of at least 20.0 N/mm
(vi) a relative tear resistance in transverse direction [N/mm] according to Elmendorf method (ISO 6383-2) for a cast film thickness of 50 μm of at least 170.0 N/mm In the following the invention ($1^{st}$, $2^{nd}$, $3^{rd}$ and $4^{th}$ aspect) is defined in more detail.

The composition of the present invention is a polypropylene composition, which comprises, preferably consists of, 2 different polymer fractions (P1) and (P2).

Especially good results are achieved in case the individual components (P1) and (P2) are present in specific amounts. Thus the polypropylene composition is composed of 35 to 60 wt % of (P1) and 65 to 40 wt % of (P2), based on the polypropylene composition. Preferably fraction (P1) is present in an amount of 40 to 55 wt % and fraction (P2) is preferably present in an amount of 60 to 45 wt %.

The polypropylene composition according to this invention can be obtained by (melt)-mixing the individual fractions, i.e. $C_3C_6$ random copolymer (P1) and $C_3C_6C_2$ terpolymer (P2). During the mixing suitable additives can additionally be added. For mixing, a conventional compounding or blending apparatus, e.g. a Banbury mixer, a 2-roll rubber mill, Buss-co-kneader or a twin screw extruder may be used. The polymer composite recovered from the extruder is usually in the form of pellets.

Preferably the polypropylene composition according to this invention is obtained by a sequential polymerization process comprising at least two reactors connected in series, as described below (in-situ blend or reactor blend).

$C_3C_6$ random copolymer (P1), i.e. fraction (P1), has an hexene content in the range of 0.5 to 2.5 wt %, based on fraction (P1). The hexene content is preferably in the range of 0.7 to 2.3 wt %, based on fraction (P1).

$C_3C_6C_2$ terpolymer (P2), i.e. fraction (P2), has an hexene content in the range of 4.0 to 10.0 wt %, based on fraction (P2). The hexene content is preferably in the range of 4.5 to 8.0 wt %, based on fraction (P2)

The ethylene content in fraction (P2) is in the range of 0.1 to 1.5 wt %, based on fraction (P2), preferably in the range of 0.3 to 1.2 wt %, based on fraction (P2).

The ratio of the hexene content of the 2 fractions P2 and P1 (P2/P1) is between 2.5 and 8.0, preferably between 3.0 and 5.0.

The ratio of the total hexene amount of the composition to the hexene amount of polymer fraction P1 is between 1.5 and 4.0, preferably between 1.8 and 3.0.

The total amount of hexene in the composition comprising polymer fraction P1 and P2 is in the range of 2.5 to 8.0 wt %, preferably in the range of 3.0 to 6.0 wt %.

The total amount of ethylene in the composition comprising polymer fraction P1 and P2 is in the range of 0.05 to 0.8 wt %, preferably in the range of 0.1 to 0.7 wt %.

The overall melt flow rate, i.e. the melt flow rate MFR2 (230° C.) measured according to ISO 1133 of polypropylene composition can be in a relatively broad range.

Accordingly in one embodiment the polypropylene composition has a melt flow rate MFR2 (230° C.) of at least 2.0 g/10 min up to 15.0 g/10 min preferably of at least 4.0 g/10 min, up to 12 g/10 min and more preferably of at least 5.0 g/10 min up to 10 g/10 min.

The inventive polypropylene composition is featured by a rather high melting temperature.

Accordingly it is appreciated that the inventive $C_2C_3$ random copolymer composition has a melting temperature in the range of more than 128 to 145° C., preferably in the range of 130 to 142° C., and more preferably in the range of 132 to 140° C.

Additionally it is appreciated that the inventive polypropylene composition has crystallization temperature in the range of 82 to 110° C., preferably in the range of 84 to 105° C. and more preferably in the range of 86 to 100° C.

Furthermore the inventive polypropylene composition is characterized by a low amount of hexane solubles. Thus the inventive polypropylene composition has hexane solubles content determined in accordance with FDA section 177.1520 of at most 1.0 wt %, preferably of at most 0.9 wt % and more preferably of at most 0.7 wt %.

The xylene cold soluble fraction (XCS) of the instant polypropylene composition is in the range of 10.0 to 40.0 wt % (determined at 25° C. according ISO 16152; first edition; 2005-07-01), preferably in the range of 15.0 to 30.0 wt % and more preferably in the range 18.0 to 25.0 wt %.

The polypropylene composition comprising the 2 polymer fractions (P1) and (P2) as described above is obtainable, preferably obtained, in the presence of a metallocene catalyst.

The metallocene catalyst can be a supported catalyst, using conventional supports or can be free from an external carrier. Preferably used are metallocene catalysts which are free from an external carrier.

Accordingly the polypropylene composition is in particular obtainable, preferably obtained, by a sequential polymerization process comprising at least two reactors connected in series, wherein said process comprises the steps of
a) polymerizing in a first reactor (R-1) being a slurry reactor (SR), preferably a loop reactor (LR), propylene and hexene, obtaining a $C_3C_6$ random copolymer (P1) as defined above,
b) transferring said $C_3C_6$ random copolymer (P1) and unreacted comonomers of the first reactor in a second reactor (R-2) being a first gas phase reactor (GPR-1),
c) feeding to said second reactor (R-2) propylene, hexene and ethylene,
d) polymerizing in said second reactor (R-2) and in the presence of said first $C_3C_6$ random copolymer fraction (P1) propylene, hexene and ethylene obtaining a $C_3C_6C_2$ terpolymer fraction (P2),
said $C_3C_6$ random copolymer (P1) and said $C_3C_6C_2$ terpolymer fraction (P2) form the polypropylene composition as defined above,
whereby the polymerization takes place in the presence of single site solid particulate catalyst, preferably a catalyst comprising (i) a complex of formula (I):

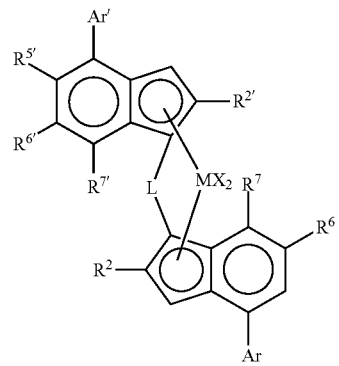

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;
$R^2$ and $R^{2'}$ are each independently a $C_1$-$C_{20}$ hydrocarbyl radical optionally containing one or more heteroatoms from groups 14-16;
$R^{5'}$ is a $C_{1-20}$ hydrocarbyl group containing one or more heteroatoms from groups 14-16 optionally substituted by one or more halo atoms;
$R^6$ and $R^{6'}$ are each independently hydrogen or a $C_{1-20}$ hydrocarbyl group optionally containing one or more heteroatoms from groups 14-16;
$R^7$ and $R^{7'}$ are each independently hydrogen or $C_{1-20}$ hydrocarbyl group optionally containing one or more heteroatoms from groups 14-16;
Ar is independently an aryl or heteroaryl group having up to 20 carbon atoms optionally substituted by one or more groups $R^1$;
Ar' is independently an aryl or heteroaryl group having up to 20 carbon atoms optionally substituted by one or more groups $R^1$;
each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$;
each $R^4$ is a $C_{1-20}$ hydrocarbyl group;
and (ii) a cocatalyst comprising a compound of a group 13 metal, e.g. Al or boron compound.

The term "sequential polymerization process" indicates that the polypropylene composition is produced in at least two reactors connected in series. Accordingly, a decisive aspect of the present process is the preparation of the polypropylene composition in at least two separate reactors. Thus the present process comprises at least a first reactor (R-1) and a second reactor (R-2). Optionally a third reactor (R-3) may be used. In one specific embodiment the instant process consists of the two polymerization reactors (R-1) and (R-2). The term "polymerization reactor" shall indicate that the main polymerization takes place. Thus in case the process consists of two polymerization reactors, this definition does not exclude the option that the overall process comprises for instance a pre-polymerization step in a pre-polymerization reactor. The term "consists of" is only a closing formulation in view of the main polymerization reactors.

The first reactor (R-1) is a slurry reactor (SR) and can be can be any continuous or simple stirred batch tank reactor or loop reactor operating in bulk or slurry. Bulk means a polymerization in a reaction medium that comprises of at least 60% (wt/wt), preferably 100% monomer. According to the present invention the slurry reactor (SR) is preferably a (bulk) loop reactor (LR).

The second reactor (R-2) and the optional third reactor (R-3) are gas phase reactors (GPR). Such gas phase reactors (GPR) can be any mechanically mixed or fluid bed reactors.

Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

The condition (temperature, pressure, reaction time, monomer feed) in each reactor is dependent on the desired product which is in the knowledge of a person skilled in the art.

A preferred multistage process is a "loop-gas phase"-process, such as developed by Borealis (known as BORSTAR® technology) described e.g. in patent literature, such as in EP 0 887 379 or in WO 92/12182.

Preferably, in the instant process for producing the polypropylene composition as defined above, the conditions for the first reactor (R-1), i.e. the slurry reactor (SR), like a loop reactor (LR), of step (a) may be as follows:

the temperature is within the range of 40° C. to 110° C., preferably between 60° C. and 100° C., more preferably between 65 and 95° C., the pressure is within the range of 20 bar to 80 bar, preferably between 40 bar to 70 bar, hydrogen can be added for controlling the molar mass in a manner known per se.

Subsequently, the reaction mixture of the first reactor (R-1) is transferred to the second reactor (R-2), i.e. gas phase reactor (GPR-1), where the conditions are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the optional third reactor (R-3), i.e. gas phase reactor (GPR-2), is similar to the second reactor.

The residence time can vary in the reactors.

In one embodiment of the process for producing the polypropylene composition the residence time in bulk reactor, e.g. loop is in the range 0.1 to 2.5 hours, e.g. 0.15 to 1.5 hours and the residence time in gas phase reactors will generally be 0.2 to 6.0 hours, like 0.3 to 4.0 hours.

If desired, the polymerization may be effected in a known manner under supercritical conditions in the first reactor, i.e. in the slurry reactor, like in the loop reactor, and/or as a condensed mode in the gas phase reactors.

In the following the catalyst component is defined in more detail. Preferably the catalyst comprises (i) a complex of formula (I):

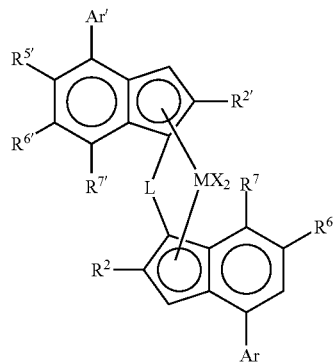

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;
$R^2$ and $R^{2'}$ are each independently a $C_1$-$C_{20}$ hydrocarbyl radical optionally containing one or more heteroatoms from groups 14-16;
$R^{5'}$ is a $C_{1-20}$ hydrocarbyl group containing one or more heteroatoms from groups 14-16 optionally substituted by one or more halo atoms;
$R^6$ and $R^{6'}$ are each independently hydrogen or a $C_{1-20}$ hydrocarbyl group optionally containing one or more heteroatoms from groups 14-16;
$R^7$ and $R^{7'}$ are each independently hydrogen or $C_{1-20}$ hydrocarbyl group optionally containing one or more heteroatoms from groups 14-16;
Ar is independently an aryl or heteroaryl group having up to 20 carbon atoms optionally substituted by one or more groups $R^1$;
Ar' is independently an aryl or heteroaryl group having up to 20 carbon atoms optionally substituted by one or more groups $R^1$;
each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$;
each $R^4$ is a $C_{1-20}$ hydrocarbyl group;
and (ii) a cocatalyst comprising a compound of a group 13 metal, e.g. Al or boron compound.

The catalyst used in the process of the invention is in solid particulate form. As mentioned above it can be supported on a conventional carrier know to an art skilled person. Preferably the used catalyst is free from an external carrier.

Ideally, the catalyst is obtainable by a process in which
(a) a liquid/liquid emulsion system is formed, said liquid/liquid emulsion system comprising a solution of the catalyst components (i) and (ii) dispersed in a solvent so as to form dispersed droplets; and
(b) solid particles are formed by solidifying said dispersed droplets.

Viewed from another aspect therefore, the invention provides a process for the preparation of a $C_2C_3$ random copolymer composition as hereinbefore defined in which the catalyst as is prepared by obtaining (i) a complex of formula (I) and a cocatalyst (ii) forming a liquid/liquid emulsion system, which comprises a solution of catalyst components (i) and (ii) dispersed in a solvent, and solidifying said dispersed droplets to form solid particles.

The term $C_{1-20}$ hydrocarbyl group includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl.

Unless otherwise stated, preferred $C_{1-20}$ hydrocarbyl groups are $C_{1-20}$ alkyl, $C_{4-20}$ cycloalkyl, $C_{5-20}$ cycloalkyl-alkyl groups, $C_{7-20}$ alkylaryl groups, $C_{7-20}$ arylalkyl groups or $C_{6-20}$ aryl groups, especially $C_{1-10}$ alkyl groups, $C_{6-10}$ aryl groups, or $C_{7-12}$ arylalkyl groups, e.g. $C_{1-8}$ alkyl groups. Most especially preferred hydrocarbyl groups are methyl, ethyl, propyl, isopropyl, tertbutyl, isobutyl, $C_{5-6}$-cycloalkyl, cyclohexylmethyl, phenyl or benzyl.

The term halo includes fluoro, chloro, bromo and iodo groups, especially chloro groups, when relating to the complex definition.

The oxidation state of the metal ion is governed primarily by the nature of the metal ion in question and the stability of the individual oxidation states of each metal ion.

It will be appreciated that in the complexes of the invention, the metal ion M is coordinated by ligands X so as to satisfy the valency of the metal ion and to fill its available coordination sites. The nature of these σ-ligands can vary greatly.

Such catalysts are described in WO2013/007650 which is incorporated herein by reference. Thus, preferred complexes of use in the invention are of formula (II') or (II)

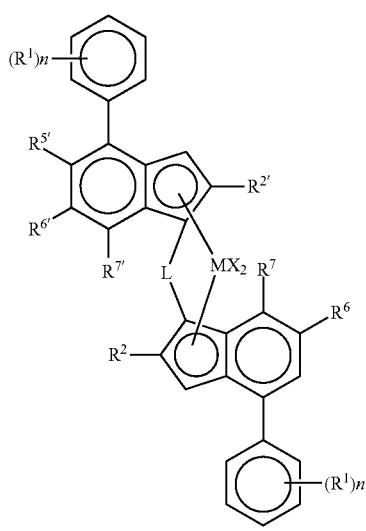

(II')

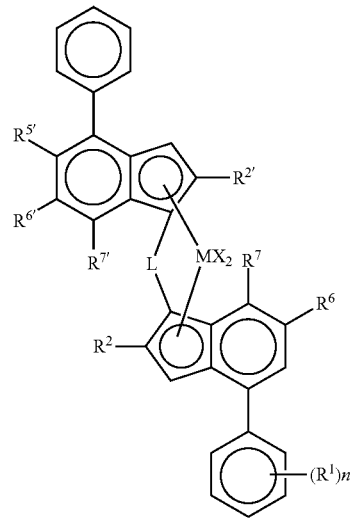

(II)

wherein

M is zirconium or hafnium;

each X is a sigma ligand, preferably each X is independently a hydrogen atom, a halogen atom, $C_{1-6}$ alkoxy group, $C_{1-6}$ alkyl, phenyl or benzyl group;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_{1-20}$ alkyl, $C_{3-10}$ cycloalkyl, tri($C_{1-20}$-alkyl)silyl, $C_{6-20}$-aryl, $C_{7-20}$ arylalkyl or $C_{7-20}$ alkylaryl;

each $R^2$ or $R^{2'}$ is a $C_{1-10}$ alkyl group;

$R^{5'}$ is a $C_{1-10}$ alkyl group or $Z'R^{3'}$ group;

$R^6$ is hydrogen or a $C_{1-10}$ alkyl group;

$R^{6'}$ is a $C_{1-10}$ alkyl group or $C_{6-10}$ aryl group;

$R^7$ is hydrogen, a $C_{1-6}$ alkyl group or $ZR^3$ group;

$R^{7'}$ is hydrogen or a $C_{1-10}$ alkyl group;

Z and Z' are independently O or S;

$R^{3'}$ is a $C_{1-10}$ alkyl group, or a $C_{6-10}$ aryl group optionally substituted by one or more halo groups;

$R^3$ is a $C_{1-10}$-alkyl group;

each n is independently 0 to 4, e.g. 0, 1 or 2;

and each $R^1$ is independently a $C_{1-20}$ hydrocarbyl group, e.g. $C_{1-10}$ alkyl group.

Further preferred complexes of use in the invention are of formula (III') or (III):

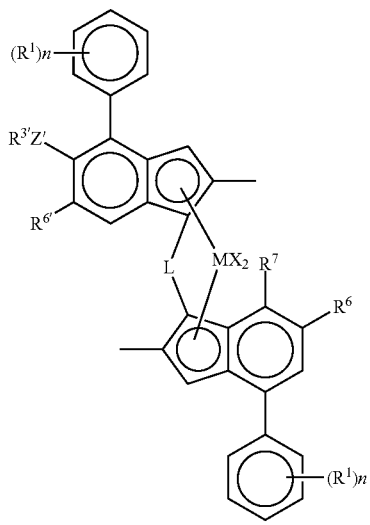

(III')

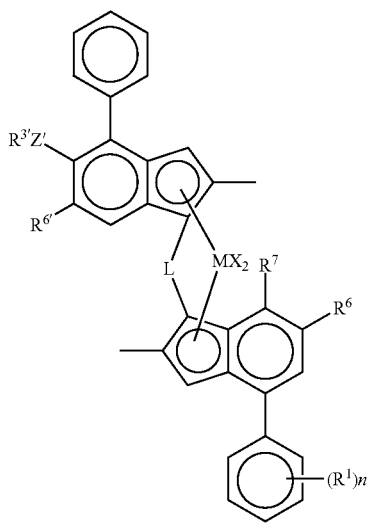

(III)

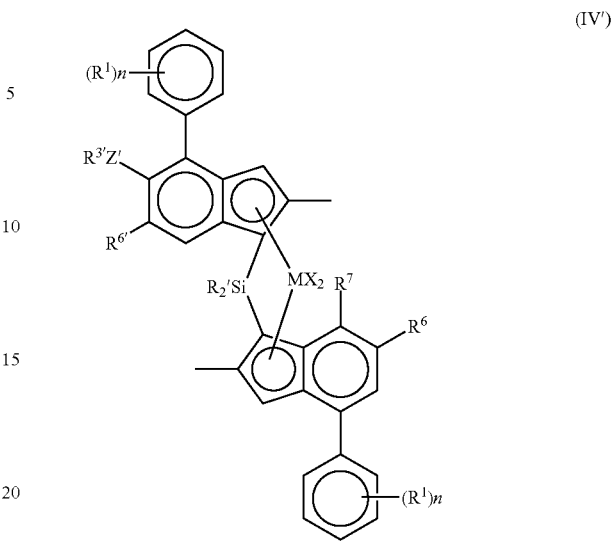

(IV')

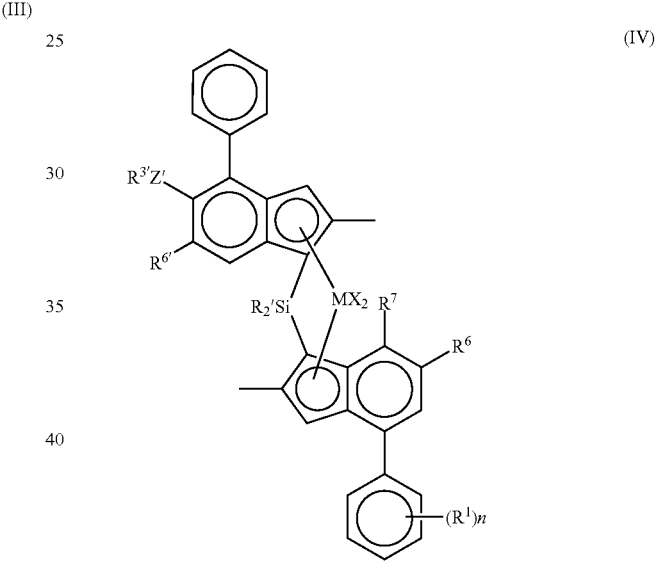

(IV)

M is zirconium or hafnium;

each X is a sigma ligand, preferably each X is independently a hydrogen atom, a halogen atom, $C_{1-6}$ alkoxy group, $C_{1-6}$ alkyl, phenyl or benzyl group;

L is a divalent bridge selected from —R'$_2$C— or —R'$_2$Si— wherein each R' is independently a hydrogen atom, $C_{1-20}$ alkyl or $C_{3-10}$ cycloalkyl;

$R^6$ is hydrogen or a $C_{1-10}$ alkyl group;

$R^{6'}$ is a $C_{1-10}$ alkyl group or $C_{6-10}$ aryl group;

$R^7$ is hydrogen, $C_{1-6}$ alkyl or $OC_{1-6}$ alkyl;

Z' is O or S;

$R^{3'}$ is a $C_{1-10}$ alkyl group, or $C_{6-10}$ aryl group optionally substituted by one or more halo groups;

n is independently 0 to 4, e.g. 0, 1 or 2; and each $R^1$ is independently a $C_{1-10}$ alkyl group.

Further preferred complexes of use in the invention are of formula (IV') or (IV):

M is zirconium or hafnium;

each X is a sigma ligand, preferably each X is independently a hydrogen atom, a halogen atom, $C_{1-6}$-alkoxy group, $C_{1-6}$-alkyl, phenyl or benzyl group;

each R' is independently a hydrogen atom, $C_{1-20}$ alkyl or $C_{3-7}$ cycloalkyl;

$R^6$ is hydrogen or a $C_{1-10}$ alkyl group;

$R^{6'}$ is a $C_{1-10}$ alkyl group or $C_{6-10}$ aryl group;

$R^7$ is hydrogen, $C_{1-6}$ alkyl or $OC_{1-6}$ alkyl;

Z' is O or S;

$R^{3'}$ is a $C_{1-10}$ alkyl group, or $C_{6-10}$ aryl group optionally substituted by one or more halo groups;

n is independently 0, 1 to 2; and each $R^1$ is independently a $C_{3-8}$ alkyl group.

Most especially, the complex of use in the invention is of formula (V') or (V):

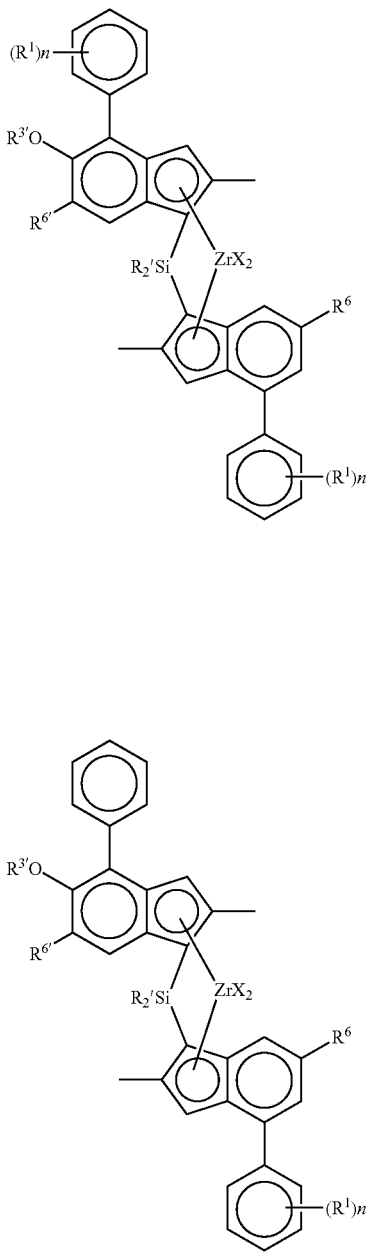

(V')

(V)

wherein each X is a sigma ligand, preferably each X is independently a hydrogen atom, a halogen atom, $C_{1-6}$-alkoxy group, $C_{1-6}$-alkyl, phenyl or benzyl group;

R' is independently a $C_{1-6}$ alkyl or $C_{3-10}$ cycloalkyl;

$R^1$ is independently $C_{3-8}$ alkyl;

$R^6$ is hydrogen or a $C_{3-8}$ alkyl group;

$R^{6'}$ is a $C_{3-8}$ alkyl group or $C_{6-10}$ aryl group;

$R^{3'}$ is a $C_{1-6}$ alkyl group, or $C_{6-10}$ aryl group optionally substituted by one or more halo groups; and n is independently 0, 1 or 2.

Particular compounds of the invention include:

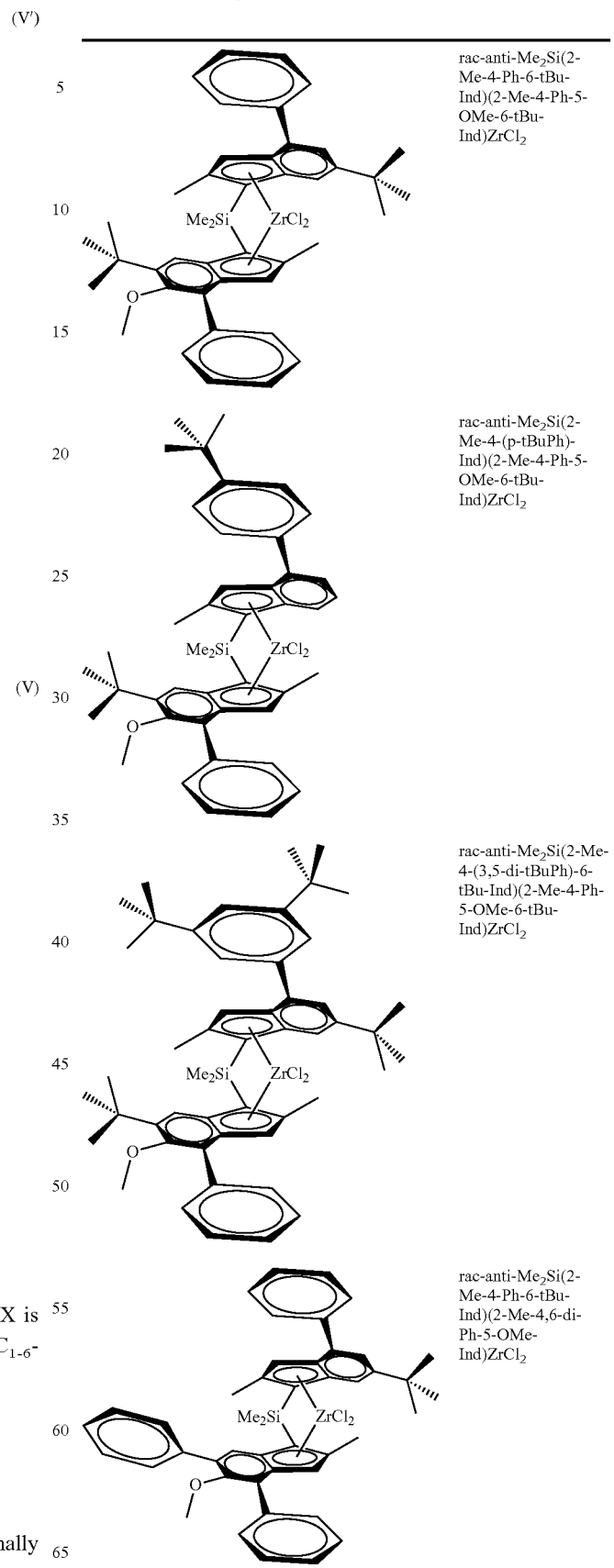

rac-anti-Me$_2$Si(2-Me-4-Ph-6-tBu-Ind)(2-Me-4-Ph-5-OMe-6-tBu-Ind)ZrCl$_2$ rac-anti-Me$_2$Si(2-Me-4-(p-tBuPh)-Ind)(2-Me-4-Ph-5-OMe-6-tBu-Ind)ZrCl$_2$ rac-anti-Me$_2$Si(2-Me-4-(3,5-di-tBuPh)-6-tBu-Ind)(2-Me-4-Ph-5-OMe-6-tBu-Ind)ZrCl$_2$ rac-anti-Me$_2$Si(2-Me-4-Ph-6-tBu-Ind)(2-Me-4,6-di-Ph-5-OMe-Ind)ZrCl$_2$

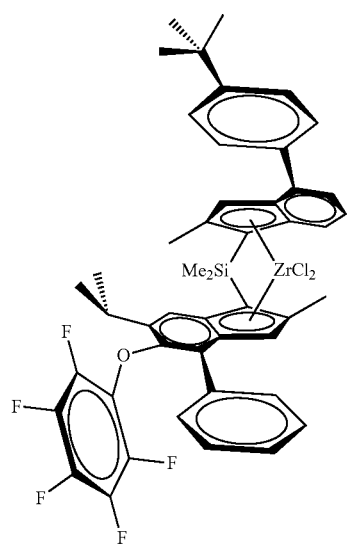
rac-anti-Me₂Si(2-Me-4-(p-tBuPh)-Ind)(2-Me-4-Ph-5-OC₆F₅)-6-iPr-Ind)ZrCl₂
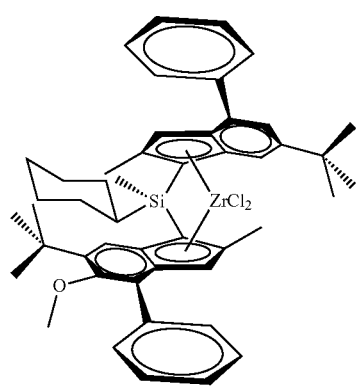
rac-anti-Me(CyHex)Si(2-Me-4-Ph-6-tBu-Ind)(2-Me-4-Ph-5-OMe-6-tBu-Ind)ZrCl₂
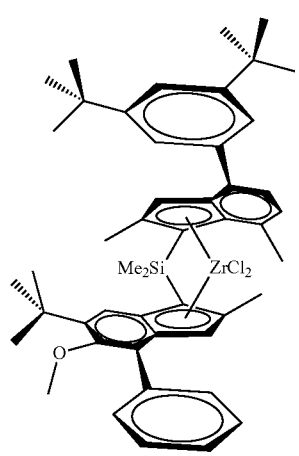
rac-anti-Me₂Si(2-Me-4-(3,5-di-tBuPh)-7-Me-Ind)(2-Me-4-Ph-5-OMe-6-tBu-Ind)ZrCl₂
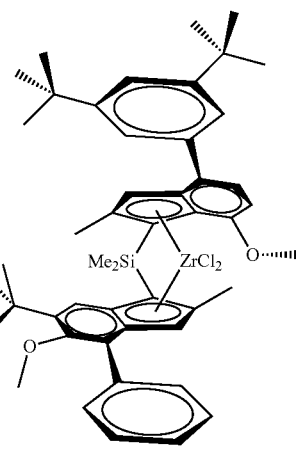
rac-anti-Me₂Si(2-Me-4-(3,5-di-tBuPh)-7-OMe-Ind)(2-Me-4-Ph-5-OMe-6-tBu-Ind)ZrCl₂
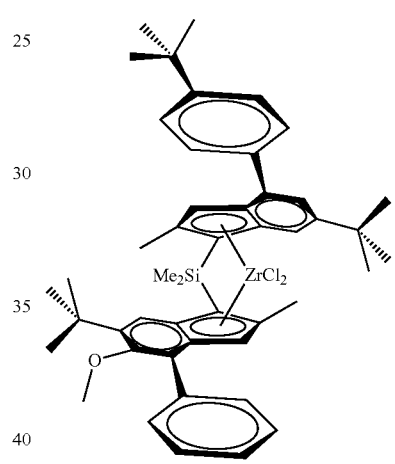
rac-anti-Me₂Si(2-Me-4-(p-tBuPh)-6-tBu-Ind)(2-Me-4-Ph-5-OMe-6-tBu-Ind)ZrCl₂
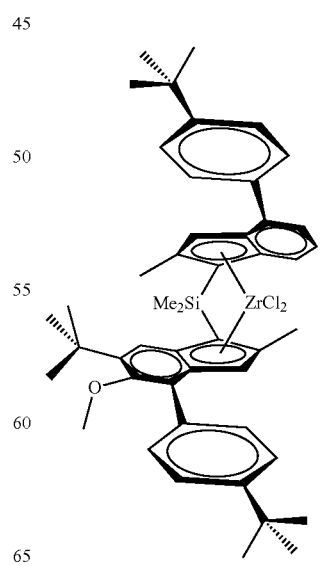
rac-anti Me₂Si(2-Me-4-(p-tBuPh)-Ind)(2-Me-4-(4-tBuPh)-5-OMe-6-tBu-Ind)ZrCl₂

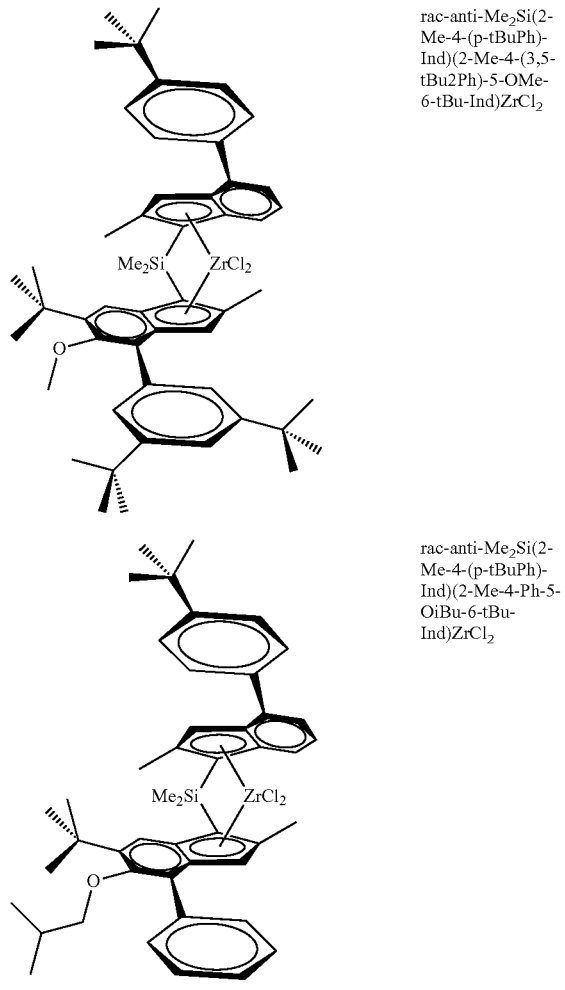

rac-anti-Me$_2$Si(2-Me-4-(p-tBuPh)-Ind)(2-Me-4-(3,5-tBu2Ph)-5-OMe-6-tBu-Ind)ZrCl$_2$ rac-anti-Me$_2$Si(2-Me-4-(p-tBuPh)-Ind)(2-Me-4-Ph-5-OiBu-6-tBu-Ind)ZrCl$_2$ Most preferably rac-anti-Me$_2$Si(2-Me-4-(p-tBuPh)-Ind)(2-Me-4-Ph-5-OMe-6-tBu-Ind)ZrCl$_2$ is used The synthesis of these materials is described in WO2013/007650.

Cocatalyst

To form an active catalytic species it is normally necessary to employ a cocatalyst as is well known in the art. Cocatalysts comprising one or more compounds of Group 13 metals, like organoaluminium compounds or borates used to activate metallocene catalysts are suitable for use in this invention. Thus the cocatalyst is preferably an alumoxane, like MAO. Borate cocatalysts can also be employed. The use of B(C$_6$F$_5$)$_3$, C$_6$H$_5$N(CH$_3$)$_2$H:B(C$_6$F$_5$)$_4$, (C$_6$H$_5$)$_3$C:B(C$_6$F$_5$)$_4$ or Ni(CN)$_4$[B(C$_6$F$_5$)$_3$]$_4$$^{2-}$ is especially preferred. Suitable cocatalysts are described in WO2013/007650.

Suitable amounts of cocatalyst will be well known to the skilled man.

Manufacture

The catalyst used to manufacture the heterophasic copolymers of the invention is ideally provided in solid particulate form but unsupported, i.e. no external carrier is used. In order to provide the catalyst of the invention in solid form but without using an external carrier, it is preferred if a liquid liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape and particle size and without using any added external porous support material, such as an inorganic oxide, e.g. silica. Also desirable surface properties can be obtained. WO2013/007650 again contains comprehensive details of this process.

Catalyst Prepolymerization

The use of the heterogeneous, non-supported catalysts, (i.e. "self-supported" catalysts) might have, as a drawback, a tendency to dissolve to some extent in the polymerization media, i.e. some active catalyst components might leach out of the catalyst particles during slurry polymerization, whereby the original good morphology of the catalyst might be lost. These leached catalyst components are very active possibly causing problems during polymerization. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerization which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerize" the catalyst before using it in polymerization process. It has to be noted that prepolymerization in this regard is part of the catalyst preparation process, being a step carried out after a solid catalyst is formed. This catalyst prepolymerization step is not part of the actual polymerization configuration, which might comprise a conventional process prepolymerization step as well. After the catalyst prepolymerization step, a solid catalyst is obtained and used in polymerization.

Catalyst "prepolymerization" takes place following the solidification step of the liquid-liquid emulsion process hereinbefore described. Prepolymerization may take place by known methods described in the art, such as that described in WO 2010/052263, WO 2010/052260 or WO 2010/052264. Preferable embodiments of this aspect of the invention are described herein.

As monomers in the catalyst prepolymerization step preferably alpha-olefins are used. Preferable C$_2$-C$_{10}$ olefins, such as ethylene, propylene, 1-butene, 1-pentene, 1-hexene, 4-methyl-1-pentene, 1-heptene, 1-octene, 1-nonene 1-decene, styrene and vinylcyclohexane are used. Most preferred alpha-olefins are ethylene and propylene.

The catalyst prepolymerization may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per)fluorinated hydrocarbons is typically in the range of 0 to 140° C., preferably 30 to 120° C., like 50 to 110° C.

Where the catalyst prepolymerization is done in fluorinated hydrocarbons, the temperature for the prepolymerization step is below 70° C., e.g. in the range of −30 to 70° C., preferably 0-65° C. and more preferably in the range 20 to 55° C.

Pressure within the prepolymerization vessel is preferably higher than atmospheric pressure to minimize the eventual leaching of air and/or moisture into the catalyst vessel. Preferably the pressure is in the range of at least 1 to 15 bar, preferably 2 to 10 bar. The prepolymerization vessel is preferably kept in an inert atmosphere, such as under nitrogen or argon or similar atmosphere.

Prepolymeriztaion is continued until the prepolymerization degree defined as weight of polymer matrix/weight of solid catalyst before prepolymerization step is reached. The degree is below 25, preferably 0.5 to 10.0, more preferably 1.0 to 8.0, most preferably 2.0 to 6.0.

Use of the catalyst prepolymerization step offers the advantage of minimising leaching of catalyst components and thus local overheating.

After prepolymerization, the catalyst can be isolated and stored.

The present invention is not only related to the inventive polypropylene composition itself, but also to its use and to articles comprising the inventive polypropylene composition.

The polypropylene composition may contain additives known in the art, like antioxidants, nucleating agents, slip agents and antistatic agents. Typically the polypropylene composition may contain not more than 7 wt %, yet more preferably not more than 5 wt %, like not more than 2.5 wt % of additives mentioned herein.

Thus, in a fourth aspect the invention is related to the use of the above defined polypropylene composition for preparing articles.

Suitable articles are films for flexible packaging systems, such as bags or pouches for food and pharmaceutical packaging or medical articles in general.

Accordingly in a further embodiment the present invention is directed to an article, especially to films, comprising at least 70.0 wt %, preferably comprising at least 80.0 wt %, more preferably comprising at least 90.0 wt %, still more preferably comprising at least 95.0 wt %, yet more preferably comprising at least 99.0 wt % of the instant polypropylene composition.

Preferred articles are films, which may be unoriented or oriented and which can be obtained by any process known to an art skilled person, like cast film technology of extrusion blown film technology.

The films are preferably used in multilayer film structures as sealing layer, preferably as very thin sealing layer, on top of the multilayer structure.

Description of Film Production by Blown Film Technology

The above described polypropylene composition is capable of being manufactured into water or air quench blown films, preferably air quenched blown films, on typical polyethylene blown film production equipment.

In principle the process comprising the steps of
(i) blowing up a tube of molten material with air perpendicularly to the upwards direction from a side-fed blown film die;
(ii) cooling it down with water contact cooling ring or air quench;
(iii) folding it and guiding it over deflector rolls onto the winder Blown Film Technology with Water Contact Cooling Ring In this technology for producing polymer films, the molten blend is extruded through a tubular die fed by a (usually single-screw) extruder and blown up to a tube. The film tube has contact on the exterior side to a water cooling ring and is cooled down quickly. The already solidified film tube is flattened afterwards by take-up rolls and taken off to a winder.

For a more detailed description see "Polypropylene Handbook", edited by Edward P. Moore, Jr., Hanser Publishers, 1996.

Blown Film Technology with Air Quench

In this manufacturing step for air quenched blown films the film is made using at least a 1.5 blow up ratio, preferably at least a 2.0 blow up ratio, more preferably at least a 2.5 blow up ratio.

The technique of air quenched blown film extrusion is well known for the production of thin plastic films. In an advantageous process, above described blends are extruded through a circular die to form a film. Air is introduced through the center of the die to maintain the film in the form of a bubble which increases the diameter of the film about 1.5 to 6 fold, after which the bubble is collapsed onto rolers. There are a number of variations of such a process within the skill in the art. Most references to blowing polyolefin films disclose processes used for polyethylene, but these are applicable to the above described $C_2C_3$ random copolymer composition within few modifications within the skill in the art without undue experimentation. For instance cooling is often advantageously modified because the art recognizes that polypropylene cools and crystallizes at a rate different from that of polyethylene.

Therefore, adjustments to the cooling parameters often produce a more stable bubble at desired output rates.

In the formation of blown films, the melted blend (melt) enters a ring-shaped die either through the bottom or side thereof. The melt is forced through spiral grooves around the surface of a mandrel inside the die and extruded through the die opening as a thick-walled tube. The tube is expanded into a bubble of desired diameter and correspondingly decreased thickness as previously described.

Description of Film Production by Cast Film Technology

In this most simple technology for producing polymer films, the molten composition is extruded through a slot die fed by a (normally single-screw) extruder onto a first cooled roll, the so called chill-roll. From this roll, the already solidified film is taken up by a second roll (nip roll or take-up roll) and transported to a winding device after trimming the edges. Only a very limited amount of orientation is created in the film, which is determined by the ratio between die thickness and film thickness or the extrusion speed and the take-up speed, respectively.

Due to its technical simplicity, cast film technology is a very economical and easy-to-handle process. The films resulting from this technology are characterised by good transparency and rather isotropic mechanical properties (limited stiffness, high toughness).

Mono-layer films having a thickness of 5 to 300 μm, preferably 10 to 200 μm, more preferably 20 to 150 μm are suitable according to the present invention.

Films according to the present invention may be non-oriented, mono-axially or bi-axially oriented.

Especially preferred are cast-films.

Following their production films comprising the polypropylene composition may be subjected to a surface energy increasing treatment, such as for example chemical treatment, flame-treatment, plasma-treatment and Corona-treatment.

Films comprising the above defined polypropylene composition have a low seal initiation temperature (SIT), beneficial optical properties and at the same time high relative tear resistance in machine as well as in transverse direction.

Therefore, in a fifth aspect the invention is related to films comprising the above defined polypropylene composition, whereby the films are characterized by
(i) a seal initiation temperature (SIT) (determined as described in the experimental part) of below 110° C.
(ii) satisfying the equation $T_m$–SIT≥25, wherein Tm is the melting point of the polypropylene composition
(iii) a haze (determined according to ASTM D1003-00 on cast films with a thickness of 50 μm) of at most 1.5%
(iv) a transparency (determined according to ASTM D1003-00 on cast films with a thickness of 50 μm) of at least 90.0%
(v) a relative tear resistance in machine direction [N/mm] according to Elmendorf method (ISO 6383-2) for a cast film thickness of 50 μm of at least 20.0 N/mm
(vi) a relative tear resistance in transverse direction [N/mm] according to Elmendorf method (ISO 6383-2) for a cast film thickness of 50 μm of at least 170.0 N/mm The films comprising the inventive polypropylene composition have a seal initiation temperature (SIT) of below 110° C. and satisfy the equation $T_m$–SIT≥25.

Preferably the films satisfy the equation $T_m$–SIT≥27, more preferably $T_m$–SIT≥29.

Tm is the melting point of the polypropylene composition.

The haze of the films according to the invention is at most 1.5%, preferably at most 1.2%.

The relative tear resistance in machine direction [N/mm] according to Elmendorf method (ISO 6383-2) for a cast film thickness of 50 μm is at least 20.0 N/mm, preferably at least 24.0 N/mm.

The relative tear resistance in transvers direction [N/mm] according to Elmendorf method (ISO 6383-2) for a cast film thickness of 50 μm is at least 170.0 N/mm, preferably at least 190.0 N/mm.

The films according to the present invention are especially suitable as sealing layer in a multi-layer film construction, as they have a low SIT and a broad sealing window as well as beneficial optical properties.

A multi-layer film construction comprising at least one layer comprising the inventive polypropylene composition is preferably produced by multi-layer co-extrusion followed by film casting or film blowing. In this case, at least one of the outermost layers of said multi-layer film construction serving as sealing layer(s) shall comprise the inventive polypropylene composition as defined above. The inventive multilayer film construction shall preferably have a thickness in the range of 30 to 500 μm, more preferably in the range of 50 to 400 μm, like in the range of 60 to 300 μm. The sealing layer(s) comprising the inventive $C_2C_3$ random copolymer composition shall preferably have a thickness in the range of 3 to 50 μm, more preferably in the range of 5 to 30 μm, like in the range of 8 to 25 μm.

Furthermore films, respectively articles according to the present invention comprising the above defined polypropylene composition are suitable for being sterilised without negatively affecting the optical properties.

Therefore the present invention is also directed to a sterilisable or sterilised article, preferably to a sterilisable or sterilised film, like a sterilisable or sterilised film. More preferably the invention is directed to containers, i.e. pouches, especially to steam sterilisable or steam sterilised containers, i.e. pouches, preferably comprising, more preferably consisting of, the film as defined herein. The container is in particular a pouch. Further said container, i.e.

pouch, has been preferably subjected to a steam sterilisation treatment in a temperature range of about 120 to 130° C.

The films according to the invention have a haze value (determined according to ASTM D1003-00 on cast films with a thickness of 50 μm) after sterilisation at 121° C. for 30 min of at most 10.0%, preferably of at most 8.0% and a transparency (determined according to ASTM D1003-00 on cast films with a thickness of 50 μm) after sterilisation at 121° C. for 30 min of at least 90.0%.

EXPERIMENTAL PART

A) Methods

The following definitions of terms and determination methods apply for the above general description of the invention as well as to the below examples unless otherwise defined.

$MFR_2$ (230° C.) is measured according to ISO 1133 (230° C., 2.16 kg load).

Comonomer Content

The comonomer content was determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of between 100-500 micrometer and spectra recorded in transmission mode.

Specifically, the ethylene content of a polypropylene-co-ethylene copolymer is determined using the baseline corrected peak area of the quantitative bands found at 720-722 and 730-733 $cm^{-1}$.

Quantitative results are obtained based upon reference to the film thickness.

The comonomer content is herein assumed to follow the mixing rule (equation 2):

$$C_b = w_1 \cdot C_1 + w_2 \cdot C_2 \qquad (eq.\ 2)$$

Where C is the content of comonomer in weight-%, w is the weight fraction of the component in the mixture and subscripts b, 1 and 2 refer to the overall mixture, component 1 and component 2, respectively.

As it is well known to the person skilled in the art the comonomer content in weight basis in a binary copolymer can be converted to the comonomer content in mole basis by using the following equation $$c_m = \frac{1}{1 + \left(\frac{1}{c_w} - 1\right) \cdot \frac{MW_c}{MW_m}} \qquad (eq.\ 3)$$

where $c_m$ is the mole fraction of comonomer units in the copolymer, $c_w$ is the weight fraction of comonomer units in the copolymer, $MW_c$ is the molecular weight of the comonomer (such as ethylene) and $MW_m$ is the molecular weight of the main monomer (i.e., propylene).

The xylene solubles (XCS, wt.-%): Content of xylene cold solubles (XCS) is determined at 25° C. according ISO 16152; first edition; 2005-07-01. The part which remains insoluble is the xylene cold insoluble (XCI) fraction.

Calculation of hexene comonomer content, xylene solubles XS and MFR(2.16 kg, 230° C.) of the polymer fractions P2:

Calculation of the Amount of the Hexene Comonomer Content of the Polymer Fraction P2:

$$\frac{C(P1+P2) - w(P1) \times C(P1)}{w(P2)} = C(P2) \quad \text{(I)}$$

wherein w(P1) is the weight fraction [in wt %] of the polymer fraction P1 in the blend of polymer fractions P1 and P2, w(P2) is the weight fraction [in wt %] of the polymer fraction P2 in the blend of polymer fractions P1 and P2, C(P1) is the hexene comonomer content [in wt %] of the polymer fraction P1, C(P1+P2) is the hexene comonomer content [in wt %] of the blend of polymer fractions P1 and P2, C(P2) is the calculated hexene comonomer content [in wt %] of the polymer fraction P2.

Calculation of the Amount of Xylene Solubles XS of the Polymer Fraction P2:

$$\frac{XS(P1+P2) - w(P1) \times XS(P1)}{w(P2)} = XS(P2) \quad \text{(II)}$$

wherein w(P1) is the weight fraction [in wt %] of the polymer fraction P1 in the blend of polymer fractions P1 and P2, w(P2) is the weight fraction [in wt %] of the polymer fraction P2 in the blend of polymer fractions P1 and P2, XS(P1) is the amount of xylene solubles XS [in wt %] of the polymer fraction P1, XS(P1+P2) is the amount of xylene solubles XS [in wt %] of the blend of polymer fractions P1 and P2, XS(P2) is the calculated amount of xylene solubles XS [in wt %] of the polymer fraction P2.

Calculation of Melt Flow Rate $MFR_2$ (230° C.) of the Polymer Fraction P2:

$$MFR(P2) = 10^{\left[\frac{\log(MFR(P1+P2)) - w(P1) \times \log(MFR(P1))}{w(P2)}\right]} \quad \text{(III)}$$

wherein w(P1) is the weight fraction [in wt %] of the polymer fraction P1 in the blend of polymer fractions P1 and P2, w(P2) is the weight fraction [in wt %] of the polymer fraction P2 in the blend of polymer fractions P1 and P2, MFR(P1) is the melt flow rate $MFR_2$ (230° C.) [in g/10 min] of the polymer fraction P1, MFR(P1+P2) is the melt flow rate $MFR_2$ (230° C.) [in g/10 min] of the blend of polymer fractions P1 and P2, MFR(P2) is the calculated melt flow rate $MFR_2$ (230° C.) [in g/10 min] of the polymer fraction P2.

The hexane extractable fraction is determined according to FDA method (federal registration, title 21, Chapter 1, part 177, section 1520, s. Annex B) on cast films of 100 μm thickness produced on a monolayer cast film line with a melt temperature of 220° C. and a chill roll temperature of 40° C. The extraction was performed at a temperature of 50° C. and an extraction time of 30 min.

Melting Temperature ($T_m$) and Crystallization Temperature ($T_c$):

The melting temperature Tm and crystallisation temperature Tc (were measured with a TA Instruments Q2000 differential scanning calorimetry device (DSC) according to ISO 11357/3 on 5 to 10 mg samples. Crystallisation and melting temperatures were obtained in a heat/cool/heat cycle with a scan rate of 10° C./min between 30° C. and 225° C. Melting and crystallisation temperatures were taken as the peaks of the endotherms and exotherms in the cooling cycle and the second heating cycle respectively.

Tear resistance (determined as Elmendorf tear (N)): Applies for the measurement both in machine direction and in transverse direction. The tear strength is measured using the ISO 6383/2 method. The force required to propagate tearing across a film sample is measured using a pendulum device. The pendulum swings under gravity through an arc, tearing the specimen from pre-cut slit. The specimen is fixed on one side by the pendulum and on the other side by a stationary clamp. The tear resistance is the force required to tear the specimen. The relative tear resistance (N/mm) is then calculated by dividing the tear resistance by the thickness of the film.

Sealing Initiation Temperature (SIT); (sealing end temperature (SET), sealing range):

The method determines the sealing temperature range (sealing range) of polypropylene films, in particular blown films or cast films. The sealing temperature range is the temperature range, in which the films can be sealed according to conditions given below. The lower limit (heat sealing initiation temperature (SIT)) is the sealing temperature at which a sealing strength of >3 N is achieved. The upper limit (sealing end temperature (SET)) is reached, when the films stick to the sealing device. The sealing range is determined on a J&B Universal Sealing Machine Type 3000 with a film of 50 μm thickness with the following further parameters:

| Specimen width: | 25.4 mm |
|---|---|
| Seal Pressure: | 0.1 N/mm$^2$ |
| Seal Time: | 0.1 sec |
| Cool time: | 99 sec |
| Peel Speed: | 10 mm/sec |
| Start temperature: | 80° C. |
| End temperature: | 150° C. |
| Increments: | 10° C. |

Specimen is sealed A to A at each sealbar temperature and seal strength (force) is determined at each step. The temperature is determined at which the seal strength reaches 3 N.

Haze, Transparency and Clarity

Haze, transparency and clarity of cast films was measured according to ASTM D 1003 on 50 μm thick cast films.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature until being processed further.

B) Examples

The catalyst used in the polymerization processes for the polypropylene composition of the inventive example (IE1) and (IE2) was prepared as follows:

The catalyst used has been prepared following the general procedures described in WO2013/007650 to prepare catalyst E2P, using the same metallocene complex (E2 in WO2013/007650) rac-anti-dimethylsilanediyl(2-methyl-4-(4'-tert-butylphenyl)inden-1-yl)(2-methyl-4-phenyl-5-methoxy-6-tert-butylinden-1-yl) zirconium dichloride (MC1). Its composition is indicated in table 1 below:

TABLE 1

| Catalyst | Al/Zr (molar ratio) in unprepped catalys | Degree of prepping | MC in prepped cat |
|---|---|---|---|
| MC1 | 250 | 3.5 | 1.12 |

Catalyst Synthesis:

Inside the glovebox, 80.0 μl of dry and degassed FluorN 474 was mixed with 2 mL of MAO in a septum bottle and left to react overnight. The following day, 58.7 mg of the metallocene (0.076 mmol, 1 equivalent) was dissolved with 4 mL of the MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.81 g of a red solid catalyst was obtained.

Catalyst off-line prepolymerization (Prepping): The above catalyst was pre-polymerised according to the following procedure: Off-line pre-polymerisation experiment was done in a 125 mL pressure reactor equipped with gas-feeding lines and an overhead stirrer. Dry and degassed perfluoro-1.3-dimethylcyclohexane (15 cm$^3$) and 801.7 mg of the catalyst to be pre-polymerised were loaded into the reactor inside a glove box and the reactor was sealed. The reactor was then taken out from the glove box and placed inside a water cooled bath kept at 25° C. The overhead stirrer and the feeding lines were connected and stirring speed set to 450 rpm. The experiment was started by opening the propylene feed into the reactor. The propylene feed was left open and the monomer consumption was compensated by keeping the total pressure in the reactor constant (about 5 barg). The experiment was continued until a polymerisation time (17 min.) sufficient to provide the desired degree of polymerisation (DP=3.5). The reaction was stopped by flashing the volatile components. Inside the glove box, the reactor was opened and the content poured into a glass vessel. The perfluoro-1.3-dimethylcyclohexane was evaporated until a constant weight was obtained to yield 3.59 g of the pre-polymerised catalyst.

The polymerization for preparing the inventive polypropylene compositions was performed in a Borstar pilot plant with a 2-reactor set-up (loop-gas phase reactor (GPR 1))

In Table 2 the polymerization conditions for IE-1, IE-2 and IE-3 are given.

In Comparison Example CE-1 a polypropylene composition consisting of $C_3C_6$ polymer fraction P1 and $C_3C_6$ polymer fraction P2 was produced with the same catalyst without addition of ethylene.

TABLE 2

| | | Polymerization conditions | | | |
|---|---|---|---|---|---|
| | | IE-1 | IE-2 | IE-3 | CE-1 |
| Loop (fraction (P1)) | | | | | |
| Temperature | [° C.] | 75 | 75 | 75 | 75 |
| Pressure | [kPa] | 5236 | 5249 | 5235 | 5063 |
| Residence time | [h] | 0.34 | 0.34 | 0.39 | 0.45 |
| Split | [%] | 51 | 50 | 40 | 56 |
| H2/C3 ratio | [mol/kmol] | 0.06 | 0.06 | 0.06 | 0.06 |
| C6/C3 ratio | [mol/kmol] | 13.0 | 13.5 | 7.7 | 8.2 |
| MFR$_2$ | [g/10 min] | 2.4 | 2.5 | 2.4 | 3.5 |
| XCS | [wt %] | 0.80 | 0.80 | 0.50 | 0.40 |
| C6 content (NMR) | [wt %] | 2.2 | n.m. | 1.4 | 1.2 |
| GPR 1 (fraction (P2)) | | | | | |
| Temperature | [° C.] | 85 | 85 | 85 | 85 |
| Pressure | [kPa] | 2355 | 2355 | 2355 | 2299 |
| Residence time | [h] | 1.92 | 1.90 | 1.76 | 2.31 |
| Split | [%] | 49 | 50 | 60 | 44 |
| H2/C3 ratio | [mol/kmol] | 0.48 | 0.43 | 0.5 | 0.26 |
| C2/C3 ratio | [mol/kmol] | 31 | 37 | 47 | 0 |
| C6/C3 ratio | [mol/kmol] | 8.0 | 8.0 | 8.0 | 7.54 |
| MFR$_2$ GPR 1 | [g/10 min] | 33 | 26 | 15 | 26 |
| XCS GPR 1 | [wt %] | 21.9 | 23.8 | 18.1 | 14.4 |
| C2 made in GPR 1 | [wt %] | 0.6 | 0.6 | 0.5 | 0.0 |
| C6 made in GPR 1 | [wt %] | 7.4 | n.d. | 4.9 | 9.0 |
| Final polymer | | | | | |
| MFR$_2$ | [g/10 min] | 7.8 | 6.8 | 6.08 | 7.5 |
| XCS | [wt %] | 22.75 | 24.60 | 18.60 | 14.80 |
| C6 content total (NMR) | [wt %] | 4.5 | 4.5 | 3.4 | 4.3 |
| C2 content total (NMR) | [wt %] | 0.3 | 0.3 | 0.6 | 0.0 |
| C6 (P2)/C6 (P1) | | — | 3.36 | n.d. | 3.5 | 7.5 |
| C6 (total)/C6 P1 | | — | 2.0 | n.d. | 2.4 | 3.6 | n.m. not measured
n.d. not determined

All polymer powders were compounded in a co-rotating twin-screw extruder Coperion ZSK 57 at 220° C. with 0.2 wt % antiblock agent (synthetic silica; CAS-no. 7631-86-9); 0.1 wt % antioxidant (Irgafos 168FF); 0.05 wt % of a sterical hindered phenol (Irganox 1010FF); 0.02 wt % of Ca-stearat) and 0.02 wt % of a non-lubricating stearate (Synthetic hydrotalcite; CAS-no. 11097-59-9)

As Comparative Example CE-2 commercially available polymer was used:

TD215BF: sealing grade of Borealis AG; propylene-ethylene-1-butene terpolymer (CAS-No. 25895-47-0), having a melt flow rate MFR2 (230° C.) of 6 g/10 min, a melting temperature Tm of 130° C.

In Table 3 the properties of the polymers of IE-1, IE-2, IE-3 CE-1 and CE-2 are shown:

TABLE 3

| Parameter | unit | IE-1 | IE-2 | IE-3 | CE-1 | CE-2 |
|---|---|---|---|---|---|---|
| Melting temperature Tm | [° C.] | 134 | 133 | 139 | 140 | 131 |
| Crystallization temperature Tc | [° C.] | 89 | 89 | 91 | 94 | 91 |
| MFR$_2$ (230° C.) | [g/10 min] | 7.81 | 6.85 | 6.08 | 7.46 | 6.0 |

TABLE 3-continued

| Parameter | unit | IE-1 | IE-2 | IE-3 | CE-1 | CE-2 |
|---|---|---|---|---|---|---|
| C2 content total | [wt %] | 0.3 | 0.3 | 0.6 | 0.0 | 1.0 |
| C6 content total | [wt %] | 4.5 | 4.5 | 3.4 | 4.3 | 9.0* |
| XCS total | [wt %] | 22.75 | 24.60 | 18.60 | 14.80 | 4.0 |
| n-hexane solubles | [wt %] | 0.66 | 0.66 | 0.44 | 0.58 | 2.3 |

*The polymer of CE-2 has C4 as comonomer instead of C6

Furthermore the polymers of IE-1, IE-2, IE-3, CE-1 and CE-2 were converter to monolayer cast films with a thickness of 50 μm on a PM30 cast line (type laboratory extruder provided by Plastik Maschinenbau GmbH., Germany).

The equipment consists of an extruder, chill roll with air knife and a winder.

PP 3-zone screw with a diameter of 30 mm, 25D length, 200 mm die, die gap 0.5 mm
Extrusion Parameters:

Extruder temperature profile: 220° C./240° C./250° C./260° C./260° C. (Melt temperature 250° C.; melt pressure 61 bar)

Extruder speed: 50 rpm

Chill roll temperature: 10° C.

take-off speed: 10.2 m/min

In Table 4 the mechanical and optical parameters as well as the sealing performance can be seen

TABLE 4

| Parameter | unit | IE-1 | IE-2 | IE-3 | CE-1 | CE-2 |
|---|---|---|---|---|---|---|
| Rel. Tear resistance MD | [N/mm] | 46.43 | 60.1 | 24.7 | 24.2 | 27.76 |
| Rel. Tear resistance TD | [N/mm] | 217.48 | 192.18 | 252.24 | 76.66 | 159.27 |
| Transparency | [%] | 93.8 | 93.8 | 93.7 | 94.3 | 93.7 |
| Haze | [%] | 0.9 | 1.0 | 1.0 | 0.9 | 1.0 |
| Clarity | [%] | 99.1 | 99.0 | 98.8 | 99.2 | 98.2 |
| SIT | [° C.] | 102 | 103 | 107 | 106 | 107 |
| Tm − SIT | [° C.] | 32 | 30 | 32 | 34 | 24 |

The films were furthermore steam sterilized.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature until being processed further.

Optical parameter after sterilization can be seen in Table 5.

TABLE 5

| Parameter | unit | IE-1 | IE-2 | IE-3 | CE-1 | CE-2 |
|---|---|---|---|---|---|---|
| Transparency | [%] | 93.6 | 93.5 | 94.0 | 93.5 | 94.2 |
| Haze | [%] | 5.0 | 6.5 | 2.0 | 1.6 | 10.2 |
| Clarity | [%] | 97.1 | 97.5 | 98.7 | 98.5 | 94.2 |

The invention claimed is:

1. A polypropylene composition being a binary blend comprising 2 polypropylene polymer fractions P1 and P2 in specific amounts:

35 to 60 wt % of (P1) being a propylene copolymer comprising hexene-derived comonomer units in an amount of 0.5 to 2.5 wt % and 65 to 40 wt % of (P2) being a propylene terpolymer comprising hexene-derived comonomer units in an amount of 4.0 to 10.0 wt % and ethylene-derived comonomer units in an amount of 0.1 to 1.0 wt %, and whereby the composition is characterized by (i) a ratio of the hexene content of polymer fraction P2 to polymer faction P1 between 2.5 and 8.0, (ii) a ratio of the total hexene amount of the composition to the hexene amount of polymer fraction P1 between 1.5 and 4.0, (ii) a melt flow rate MFR2 (230° C.) measured according to ISO 1133 in the range of 2.0 to 15.0 g/10 min, (iii) a melting temperature Tm as determined by DSC according to ISO 11357 of from 128° C. to 145° C., (iv) a crystallization temperature $T_c$ as determined by DSC according to ISO 11357 of from 82° C. to 110° C., (v) a hexane solubles content determined in accordance with FDA section 177.1520 of at most 1.0 wt % and (vi) an amount of xylene cold soluble (XCS) in the range of 10 to 40 wt % determined at 25° C. according ISO 16152; first edition; 2005-07-01.

2. The polypropylene composition according to claim 1, whereby the composition is obtained in the presence of a metallocene catalyst.

3. A process for producing a polypropylene composition according to claim 1 by a sequential polymerization process comprising at least two reactors connected in series, wherein the process comprises the steps of a) polymerizing in a first reactor (R-1) being a slurry reactor (SR), propylene and hexene, obtaining a $C_3C_6$ random copolymer fraction (P1), b) transferring said $C_3C_6$ random copolymer fraction (P1) and unreacted comonomers of the first reactor in a second reactor (R-2) being a first gas phase reactor (GPR-1), c) feeding to said second reactor (R-2) propylene, hexene and ethylene, d) polymerizing in said second reactor (R-2) and in the presence of said first $C_3C_6$ random copolymer fraction (P1) propylene, hexene and ethylene obtaining a $C_3C_6C_2$ terpolymer fraction (P2), said $C_3C_6$ random copolymer (P1) and $C_3C_6C_2$ terpolymer fraction (P2) form the polypropylene composition as defined above, whereby the polymerization takes place in the presence of single site solid particulate catalyst free from an external carrier comprising (i) a complex of formula (I):

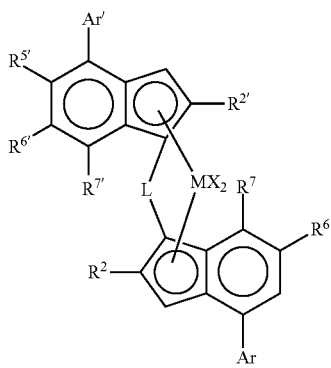

wherein

M is zirconium or hafnium;

each X is a sigma ligand;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;

$R^2$ and $R^{2'}$ are each independently a $C_1$-$C_{20}$ hydrocarbyl radical optionally containing one or more heteroatoms from groups 14-16;

$R^{5'}$ is a $C_{1-20}$ hydrocarbyl group containing one or more heteroatoms from groups 14-16 optionally substituted by one or more halo atoms;

$R^6$ and $R^{6'}$ are each independently hydrogen or a $C_{1-20}$ hydrocarbyl group optionally containing one or more heteroatoms from groups 14-16;

$R^7$ and $R^{7'}$ are each independently hydrogen or $C_{1-20}$ hydrocarbyl group optionally containing one or more heteroatoms from groups 14-16;

Ar is independently an aryl or heteroaryl group having up to 20 carbon atoms optionally substituted by one or more groups $R^1$;

Ar' is independently an aryl or heteroaryl group having up to 20 carbon atoms optionally substituted by one or more groups $R^1$;

each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$;

each $R^4$ is a $C_{1-20}$ hydrocarbyl group;

and (ii) a cocatalyst comprising a compound of a group 13 metal.

4. The process according to claim 3, wherein the catalyst comprises a complex of formula (III) or (III')

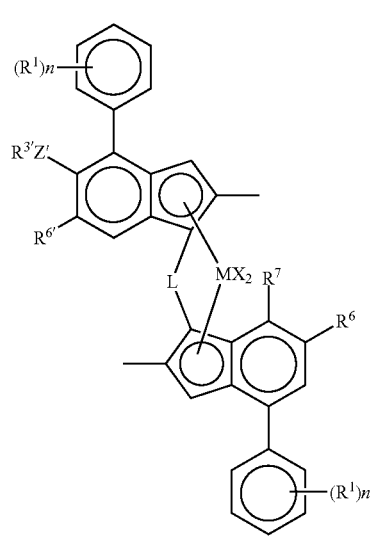

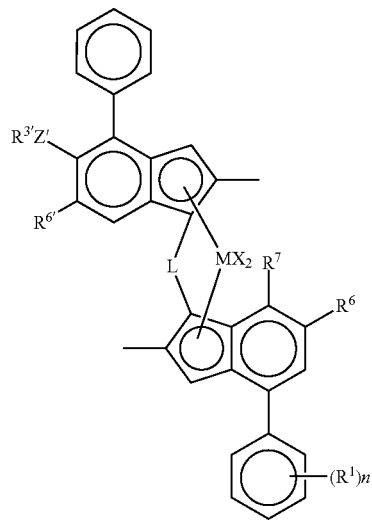

M is zirconium or hafnium;
each X is a sigma ligand;
L is a divalent bridge selected from —R'$_2$C— or —R'$_2$Si— wherein each R' is independently a hydrogen atom, $C_{1-20}$ alkyl or $C_{3-10}$ cycloalkyl;
$R^6$ is hydrogen or a $C_{1-10}$ alkyl group;
$R^{6'}$ is a $C_{1-10}$ alkyl group or $C_{6-10}$ aryl group;
$R^7$ is hydrogen, $C_{1-6}$ alkyl or $OC_{1-6}$ alkyl;
Z' is O or S;
$R^{3'}$ is a $C_{1-10}$ alkyl group, or $C_{6-10}$ aryl group optionally substituted by one or more halo groups;
n is independently 0 to 4; and
each $R^1$ is independently a $C_{1-10}$ alkyl group.

5. A process for producing water or air quench blown films, comprising
   i) blowing up a tube of a molten polypropylene composition according to claim 1 with air perpendicularly to an upwards direction from a side-fed blown film die;
   ii) cooling the composition down with a water contact cooling ring or air quench; and
   iii) folding and guiding the composition over deflector rolls onto a winder.

6. A sterilizable or sterilized article, comprising the polypropylene composition according to claim 1.

7. A sterilizable or sterilized film comprising the polypropylene composition according to claim 1.

8. The sterilizable or sterilized film according to claim 7, whereby the film is characterized by
   (i) a seal initiation temperature (SIT) of below 110° C.,
   (ii) satisfying the equation $T_m$−SIT≥25, wherein Tm is the melting temperature of the polypropylene composition,
   (iii) a haze (determined according to ASTM D1003-00 on cast films with a thickness of 50 μm) of at most 1.5%,
   (iv) a transparency (determined according to ASTM D1003-00 on cast films with a thickness of 50 μm) of at least 90.0%,
   (v) a relative tear resistance in machine direction [N/mm] according to Elmendorf method (ISO 6383-2) for a cast film thickness of 50 μm of at least 20.0 N/mm and
   (vi) a relative tear resistance in transverse direction [N/mm] according to Elmendorf method (ISO 6383-2) for a cast film thickness of 50 μm of at least 170.0 N/mm.

9. The film according to claim 8 prepared by cast film technology.

10. The film according to claim 8 having a haze value (determined according to ASTM D1003-00 on cast films with a thickness of 50 μm) after steam sterilization at 121° C. for 30 min of at most 10% and a transparency (determined according to ASTM D1003-00 on cast films with a thickness of 50 μm) after steam sterilization at 121° C. for 30 min of at least 90.0%.

11. The film according to claim 9 having a haze value (determined according to ASTM D1003-00 on cast films with a thickness of 50 μm) after steam sterilization at 121° C. for 30 min of at most 10% and a transparency (determined according to ASTM D1003-00 on cast films with a thickness of 50 μm) after steam sterilization at 121° C. for 30 min of at least 90.0%.

12. The process according to claim 3, comprising
   a) polymerizing in a first reactor (R-1) being a loop reactor (LR), propylene and hexene, obtaining a $C_3C_6$ random copolymer fraction (P1).

13. The process according to claim 4, wherein each X is independently a hydrogen atom, a halogen atom, $C_{1-6}$ alkoxy group, $C_{1-6}$ alkyl, phenyl or benzyl group.

14. The process according to claim 4, wherein n is independently 0, 1 or 2.

\* \* \* \* \*